No. 808,525. PATENTED DEC. 26, 1905.
J. P. ERIE.
ELECTRIC WATER HEATER.
APPLICATION FILED SEPT. 8, 1898.
4 SHEETS—SHEET 2.
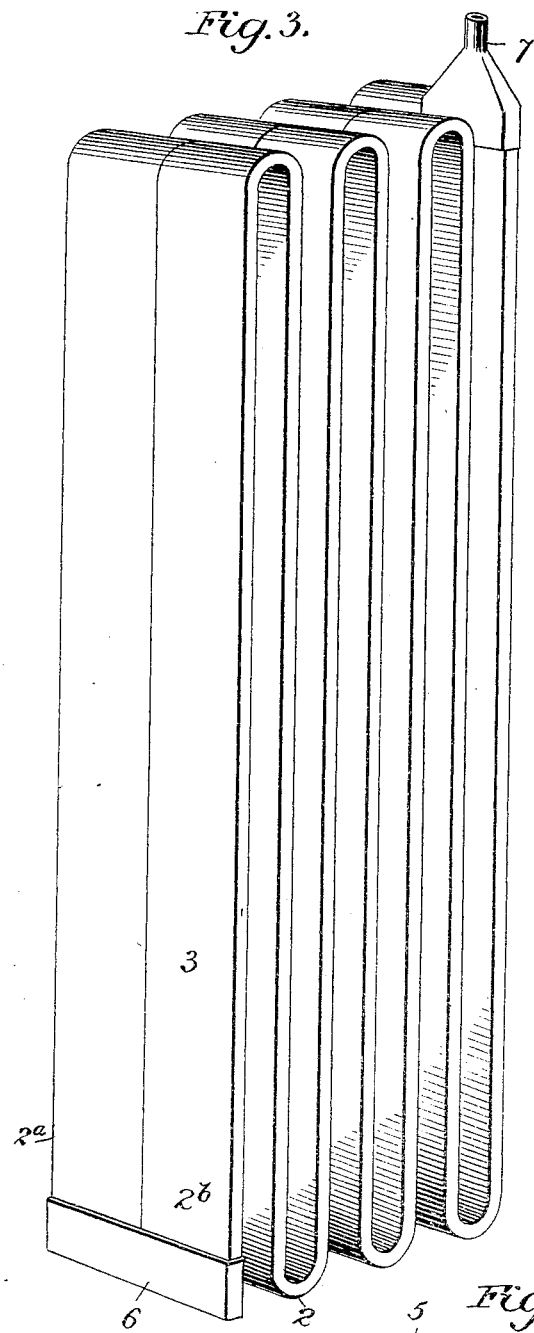
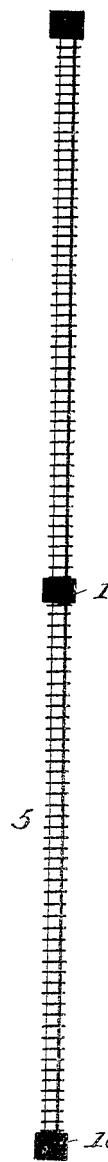
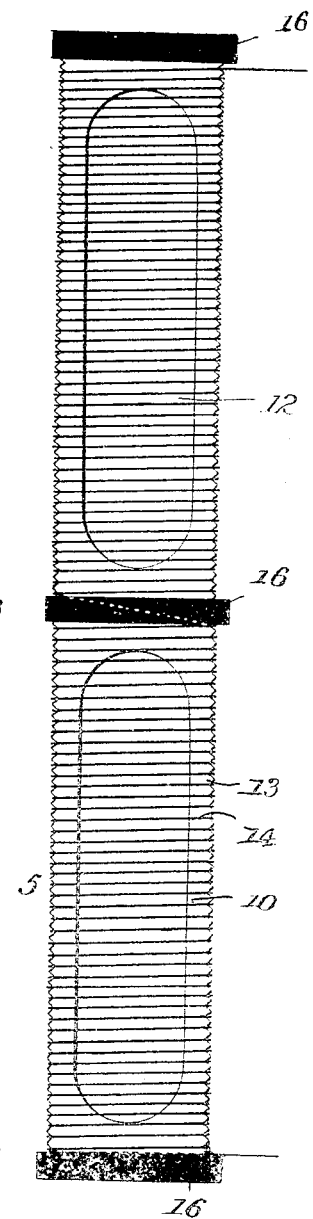
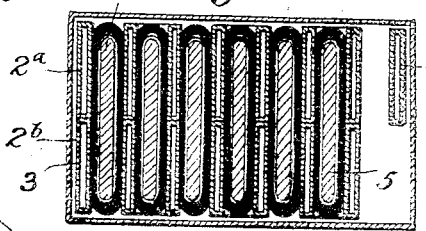

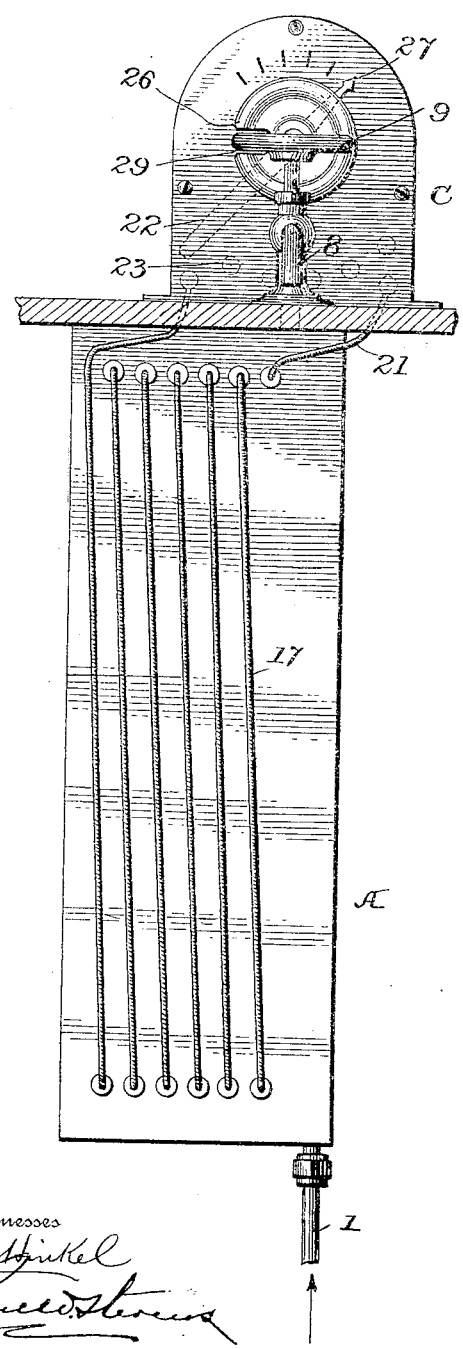
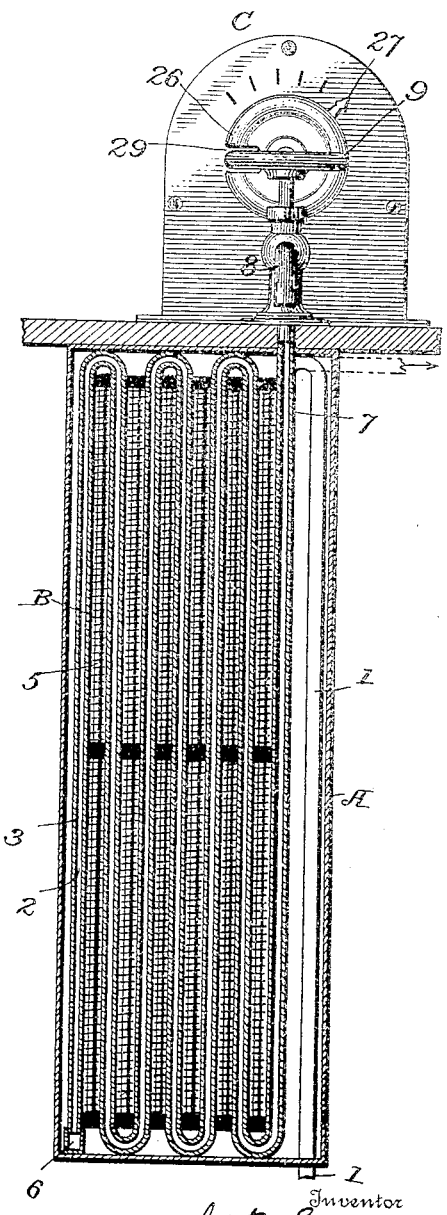

No. 808,525. PATENTED DEC. 26, 1905.
J. P. ERIE.
ELECTRIC WATER HEATER.
APPLICATION FILED SEPT. 8, 1898.

4 SHEETS—SHEET 3.

No. 808,525. PATENTED DEC. 26, 1905.
J. P. ERIE.
ELECTRIC WATER HEATER.
APPLICATION FILED SEPT. 8, 1898.
4 SHEETS—SHEET 4.
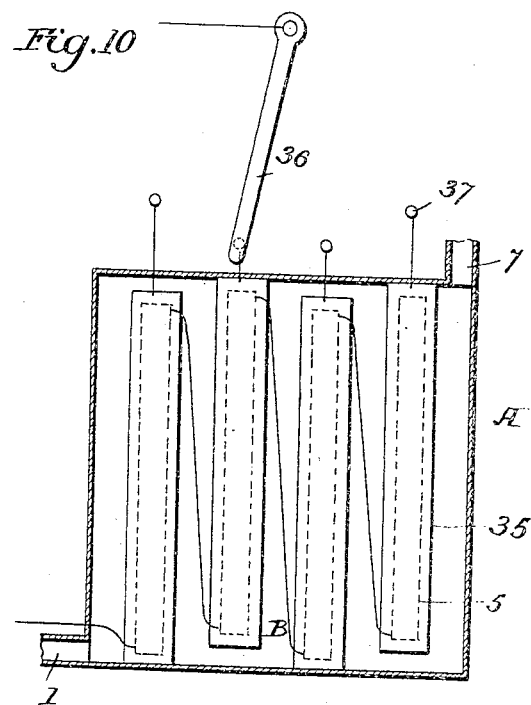
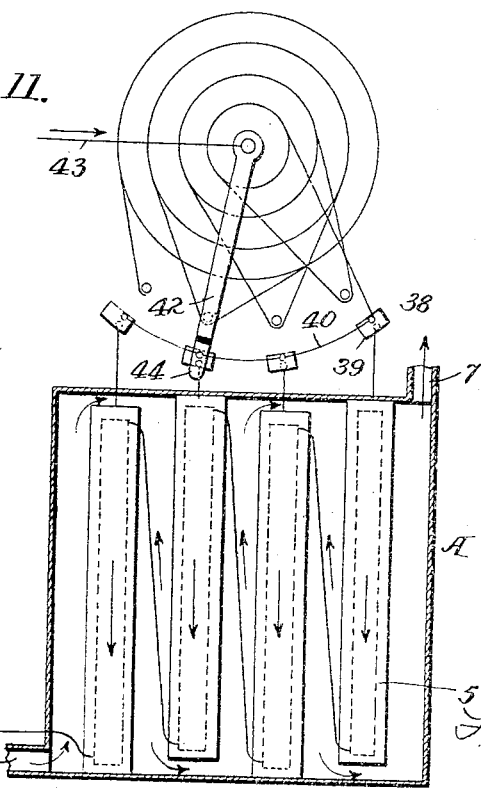
Witnesses
Inventor
J. P. Erie
Attorneys

UNITED STATES PATENT OFFICE.

JAMES PHILIP ERIE, OF LOS ANGELES, CALIFORNIA, ASSIGNOR, BY MESNE ASSIGNMENTS, TO BENJAMIN STERN.

ELECTRIC WATER-HEATER.

No. 808,525.  Specification of Letters Patent.  Patented Dec. 26, 1905.

Application filed September 8, 1898. Serial No. 690,483.

*To all whom it may concern:*

Be it known that I, JAMES PHILIP ERIE, a citizen of the United States, residing at Los Angeles, in the county of Los Angeles and State of California, have invented certain new and useful Improvements in Electric Water-Heaters, of which the following is a specification.

This invention relates to certain new and useful improvements in water-heaters, and more particularly to that class of apparatus wherein the water is heated through the medium of an electric current, the object of the invention being to provide simple, effective, and compact means whereby a stream of water may be rapidly heated, almost instantaneously in fact, to any degree as it flows through a delivery-pipe to the point of discharge.

With this object in view the invention consists in the novel construction, combination, and arrangement of parts hereinafter set forth with more particularity.

Figure 7:
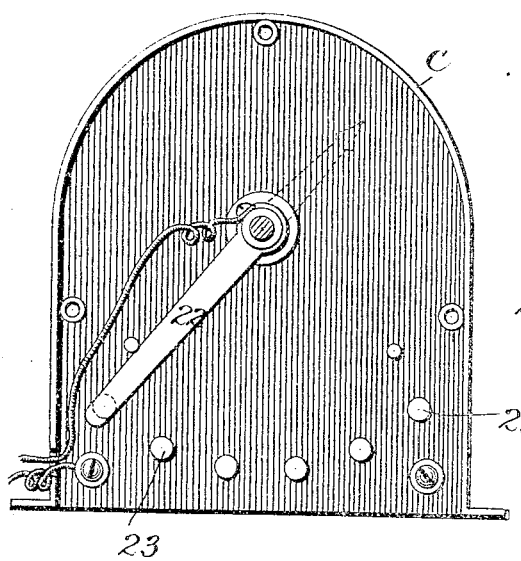
Figure 8:
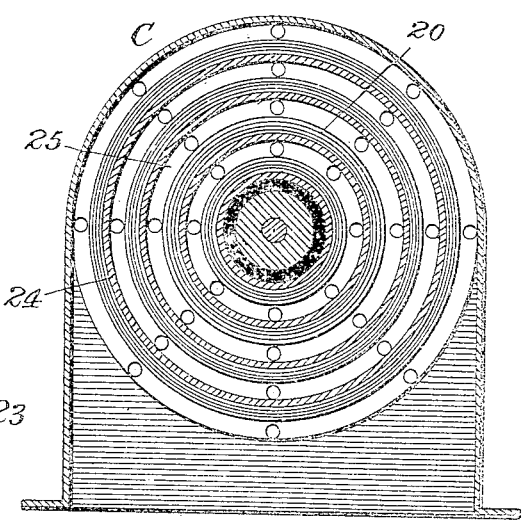
Figure 9:
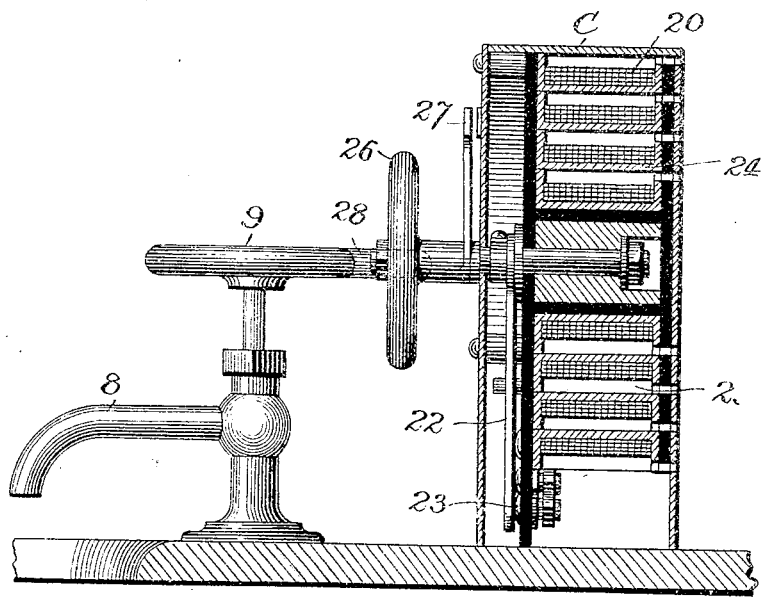

In the accompanying drawings, forming a part of this specification, and in which like letters of reference designate corresponding parts, Figure 1 is a side elevation of one form of apparatus embodying the invention. Fig. 2 is a vertical sectional view of the same. Fig. 3 is a detail perspective view of the water-tube detached. Fig. 4 is a transverse sectional view illustrating the relative arrangement of the water-tube and electric heater-sections. Figs. 5 and 6 are respectively edge and side views of one of the heater-sections. Fig. 7 is a detail view of one side of the rheostat. Fig. 8 is a vertical sectional view of the rheostat. Fig. 9 is a sectional view of the rheostat and the water-discharge pipe. Fig. 10 is a diagrammatic view of a modification, and Fig. 11 is a similar view of another modification.

Before describing in detail a construction embodying the invention it may be well to set forth briefly the broad principles thereof and the general mode of its operation in order that its nature may be more fully understood, and this will now be done.

In carrying the invention into effect a casing is employed, leading to and from which, respectively, are inlet and outlet pipes for conveying water under pressure to the casing and for conducting it therethrough to the desired point of discharge. Within the casing there is arranged one or more heating-surfaces, over which the water flows in its passage through the casing from the inlet-pipe to the outlet-pipe, and likewise disposed within the casing is an electric heater for imparting the desired degree of heat to the heating surface or surfaces, whereby the heat from said surface is imparted to the stream of water in its flow over the same. Means are also provided whereby the degree to which the water is heated in its passage through the casing may be varied as desired and accurately determined, and this result may be attained in various ways, as by heating a greater or less area of the surface with which the flowing water comes into contact or by heating a uniform or varying area of such surface to different degrees in the manner hereinafter more fully described.

By way of further preliminary explanation it may be said that it is essential in order to effectively heat a running stream of water, especially when such stream is under great pressure or when it is desired to impart a high degree of heat thereto, one of two conditions must exist—that is to say, the water must be directed over an extended heating-surface in order that it may be subjected to the action of heat for a relatively great length of time or else in the case of a heating-surface of comparatively small area being employed a greater degree of heat must be imparted thereto to rapidly raise the temperature of the water to a given point. An apparatus wherein the first of these conditions prevails must necessarily be of greater dimensions when a moderate degree of heat is used, and therefore take up considerable space, owing to the relatively greater length of pipe or heating surface which it is necessary to heat, and an apparatus wherein the second of these conditions exists naturally consumes a great amount of electric current and requires one of greater strength, in consequence of which such an apparatus would be expensive to operate.

In a heater embodying the present invention not only is an extended heating-surface employed and so arranged that it occupies very little space, but means are provided whereby different portions of or the entire area of such heating-surface may be quickly heated to any desired degree. It may also be stated that a shallow stream of water may be more quickly and uniformly heated during its passage over a heated surface than a heavy stream passing over the same surface, and taking advantage of this fact the present apparatus is constructed with heating-surfaces arranged in exceedingly close proximity to leave a narrow channel between them, through which the water flows in a thin sheet while it is being heated.

With this brief preface of setting forth the construction, operation, and advantages of the invention one of many constructions embodying the same will now be described in detail.

Referring more particularly to Figs. 1 to 9 of the drawings, A designates a casing, which may be constructed of any desired material and be of any suitable dimensions to contain the operative parts of the apparatus. Leading into the casing A is an inlet-pipe 1 for supplying water under pressure thereto, and arranged within the casing and communicating with the inlet-pipe 1 is a tortuous pipe 2, preferably formed of copper, brass, &c., and formed with flat parallel side walls 3, which constitute heating-surfaces over which the water flows in its passage through the pipe 2. The pipe 2 may be of any desired width to afford a surface of a greater or less area to the water; but it is so formed that its walls of greatest area constituting the heating-surfaces are in close proximity, so that the water flows between them in a thin sheet. The pipe 2 traverses the casing A from end to end, and the limbs thereof extend parallel to each other between its bends and are left separated to form spaces, into which are received sections 5 of an electric heater B. As shown, the pipe 2 is formed in two duplicate sections $2^a$ $2^b$, arranged side by side and connected at their ends by a chamber 6 in such a manner that the water flows from the inlet-pipe 1 through the section $2^a$ from one side of the casing to the other and there entering the section $2^b$ flows back in the opposite direction to that side of the casing from which it started and thence out through a discharge-pipe 7, into which said section $2^b$ terminates. The discharge-pipe 7 may be in the form of a conducting-main leading to different points of a building or room and provided with a number of valve-controlled branch pipes, through which the water may be drawn off. In the construction shown, which is adapted more particularly for use in connection with stationary washstands, bath-tubs, &c., the discharge-pipe 7 communicates directly with a cock 8, adapted to be opened and closed through a hand-wheel 9.

As above stated, the electric heater B is formed in sections, one of the sections being arranged in each of the spaces between adjacent limbs of the pipe 2 in close proximity to the exterior surfaces of the walls thereof, and said sections are wholly without the passage of said pipe, so that water is never brought into contact with the sections. While the heater-sections may be constructed and arranged in various ways to suit varying conditions, it is preferred in the interest of simplicity and cheapness to construct them in the manner shown, it being understood, however, that the invention is not to be limited to the use of heater-sections of any particular construction. The heater-sections employed in the present construction each comprises a flat rectangular strip 10 of porcelain, glass, or other suitable non-conducting material of sufficient stiffness to sustain a coil of wire when wrapped tightly around it, and in order to lighten the strips 10 as much as practicable they are provided with one or more openings 12, extending through them from one side to the other. In its opposite longitudinal edges each of the strips 10 is formed with a series of indentations 13, into which is received the coils of a non-insulated wire 14, wound spirally around the strip from one end to the other, the said indentations serving the function of maintaining the successive coils of the wire separated and preventing them from making contact. In order to insulate the heater-sections from the heating-surfaces of the pipe 2 and from the walls of the casing A, the strips are provided at separated points with bands 16 of insulating material, which project out beyond the planes of the wires 14 and rest in contact with the surfaces of the pipe 2 and casing A. The heater-sections are all connected together, the lower end of the wire coil of one section extending upon the exterior of the casing at 17 to the upper end of the wire coil of the next succeeding heater-section, to the end that an electric current directed through the coil of the first heater-section will travel through the coils of the remaining sections. With the parts thus constructed and arranged when an electric current is directed through the coils of the heater the wires thereof, owing to the resistance they offer to the passage of the current, will become almost instantly heated to a degree depending upon the value or strength of the electric current. This heat will be radiated to the walls or heating-surfaces of the pipe 2, and water as it flows through the said pipe in consequence of the opening of the cock 8 will be heated in proportion to the degree of heat imparted to the heating-surfaces of the pipe.

Of course it will be understood that the greater the value or strength of the current transmitted through the electric heater the greater will be the amount of heat transmitted to the heating-surfaces of the pipe 2 and to the water flowing thereon, and in order to accurately vary the strength of the current delivered to the heater, and in consequence permitting water to be raised to different temperatures, a suitable current-controller, of which there are several well-known forms, is made use of. Thus, as shown, a rheostat C is employed, it being suitably inclosed and mounted upon the top of the casing A. This rheostat, as is usual, is provided with a number of coils 20, connected together, with the inner coil in turn connected, through a wire 21, with the upper end of the first section of the electric heater B. Within the inclosing casing of the rheostat is a rotatable arm 22, connected with a source of electrical supply and adapted to make contact with any one of a series of contact-points 23, likewise arranged within the casing to cause the electric current to flow through one or more of the rheostat-coils prior to being delivered to the coils of the electric heater. It will thus be understood that the strength of the current which passes through the electric heater B is varied according to the amount of resistance it meets with in first passing through the rheostat. As shown, the rheostat is composed of a series of concentric drums 24, insulated from each other and being of different diameters to leave annular spaces 25 between them, and upon the exterior of these drums are wound the rheostat-coils 20. These coils are not, however, of sufficient thickness to fill the spaces 25; but, on the contrary, an open space is left between each coil and its surrounding drum, such space serving to permit the circulation of air which prevents undue heating of the coils.

Upon the exterior of the rheostat-casing and fixedly secured upon the shaft of the rotatable arm 22 is a hand-wheel 26, to a sleeve of which is attached a pointer 27, adapted to travel over the graduated exterior face of the casing. Thus by turning the hand-wheel 26 in the proper direction the contact-arm 22 may be moved to engage any one of the contact-points 23, thereby varying the strength of the current passing through the rheostat to the electric heater B, and the exact position of the arm 22 and the value of the current being employed may be accurately determined by the position of the pointer 27 upon the graduated face of the rheostat-casing.

As sometimes through carelessness or otherwise it may happen the water will be turned on and then turned off without turning off the electric current through the heater at the same time, resulting not only in a useless expenditure of the current, but also in the unnecessary heating of the water in the casing A, means are provided for preventing the flow of water through the apparatus being arrested until the flow of electric current through the heater shall have been cut off. As shown, this means comprises a lug 28, projecting from the periphery of the hand-wheel 9 and adapted to engage a notch or recess 29 in the edge of the hand-wheel 26 when the parts are in their normal positions and both the flow of water and of the electric current is shut off. From this it will be seen that it is impossible to turn the hand-wheel 26 without first turning the wheel 9 to permit the flow of water, and if the wheel 26 is turned after the water has been turned on it will be impossible to cut off the flow of water until the said wheel 26 has been returned to its normal position to bring its recess into position to permit the entrance of the lug 28 therein.

A somewhat-modified form of the invention is illustrated diagrammatically in Fig. 10. In this form of the invention the heater-sections 5 are inclosed in jackets 35, the walls of which constitute heating-surfaces, and these jackets are arranged in close proximity to each other to leave narrow spaces between their opposing walls, and they are so situated that one jacket extends from the bottom of the casing A to near the top thereof, and the next succeeding jacket extends from the top wall of the casing nearly to the bottom thereof, and so on. In this way a tortuous water-passage through the casing is formed, the water being directed over the top of one jacket and beneath the next succeeding jacket. A different form of control device for the electric current is also employed in this construction, the said device comprising a contact-arm 36 in circuit with the main line and adapted to make contact with a series of contact-points 37, corresponding in number to the heater-sections 5. These heater-sections are connected in series as in the construction shown in Figs. 1 to 9, and each section is likewise connected to one of the contact-points 37. In this way if the contact-arm 36 is moved upon the first contact-point the current will be directed through only the last heater-section. If it be moved upon the second point, the current will flow through the last two heater-sections, and so on, it thus being possible to heat any number of the heater-sections desired, and thereby vary the area of the surface heated and in consequence the length of time water passing through the casing is subjected to heat.

Still another modified form of the invention is illustrated diagrammatically in Fig. 11. In the construction shown in this figure the arrangement of the heater-sections 5 is the same as in Figs. 1 and 2, and in connection with the heater B a rheostat, such as is illustrated in Figs. 1 to 9, is employed. In addition to the series of contact-points 23 a second series of double contact-points 38 is provided, corresponding in number to the contact-points 23. This second series of points is formed of pairs, the points of each pair being adapted to be connected through depressible leaf-springs 39, arranged above the same, and one contact-point of each of the pairs is connected, through a conducting-wire 40 in circuit with the rheostat, with a point of each of the remaining pairs, while the second points of each pair is connected to one of the heater-sections. Arranged to cooperate with the contact-points 23 and leaf-springs 39 is a rotatable switch-arm 42, normally in circuit with the main line 43. When thus arranged, if the switch-arm be turned to make contact with the first of the points 23, an insulated end 44 of the arm will be brought upon the leaf-spring above the first pair of contact-points 38, depressing the same and completing the circuit. The current will then flow through all of the coils of the rheostat meeting the maximum resistance. Thence it will flow through the conducting-wire 40 and be directed through the coil of the last heater-section only, the current when it reaches said section being of minimum strength or value. If, however, the arm 42 is moved over the second of the contact-points, the current will meet with less resistance in passing through the rheostat, and in consequence will be stronger when it reaches the heater B. When the arm 42 is in this position, as indicated in the drawings, the current will be caused to flow through the last two sections of the heater, thereby resulting not only in an increase of the surface heated, but likewise in an increase in the strength of the current and the consequent higher temperature of the heating-surfaces, and so on, a stronger current being directed through the last three of the heater-sections and a still stronger current through all four of the sections. As rheostat-coils are cut out heater-coils are cut in; but the resistance of the rheostat-coils must necessarily be much greater than that of the heater-coils to obtain the results set forth.

From the foregoing it will be apparent that a simple and efficient water-heater is provided whereby a stream of running water may be almost instantaneously heated, and to different degrees, and the heater being extremely compact it may be used in connection with stationary washstands, bath-tubs, or the like, or it can be carried around and used in different portions of a building or room.

I am aware that it has been proposed heretofore to confine a large volume of water in a quiescent state in a vessel and heat the vessel and its contained water by means of an electrical heater. Such an apparatus is wholly impracticable for heating a flowing stream of water, however, and forms no part of the present invention. While I have shown in detail only one construction for carrying out my invention, it will be understood that the principle thereof may be embodied in various constructions, and it will also be obvious that various changes in the construction and arrangement of the parts of the apparatus shown may be made without departing from the spirit or scope of the invention, since

What I claim is—

1. In a water-heater, the combination of a casing having inlet and outlet water-pipes, a tortuous water-pipe comprising duplicate sections having a connecting-chamber between the adjacent ends of the sections and extending through the casing, one section connecting the inlet and another the outlet pipes, a sectional water-heater within the casing the sections of said heater being connected and arranged intermediate the adjacent walls of the water-pipe, and means for directing an electric current through the heater, substantially as described.

2. In a water-heater, the combination with a casing having an inlet and an outlet water-pipe, and a tortuous passage extending therethrough connecting the inlet and outlet pipes, said passage being formed with flat walls constituting heating-surfaces and the limbs of the passages extending substantially parallel to each other between the bends, and separated to form spaces between the limbs, removable electric heater-sections arranged within the spaces between said limbs, said sections being electrically connected and formed of flat strips of insulating material provided with non-insulated coils, and means for controlling the flow of current to the heater, substantially as and for the purposes set forth.

3. In a heater, the combination with a surface to be heated, and means for heating the same, of means for simultaneously increasing the area of surface heated and the degree of heat imparted to the same, substantially as described.

4. In a heater, the combination with a surface to be heated, and means for heating the same, of means for varying the area of the surface heated and the degree of heat imparted thereto according to the variations of heated area, substantially as described.

5. In a water-heater, the combination with a casing, and means for circulating water through the same, of heater-sections, means for heating the same and for varying the length of time water circulating through the casing is subjected to heat without varying the length of time that heat is supplied to the heater-sections substantially as described.

6. In a water-heater, the combination with a casing, and means for circulating water therethrough, of means for heating said casing and for varying the length of time water circulating through the casing is subjected to heat without varying the length of time that heat is supplied to said casing substantially as described.

7. In a heater, the combination with heater-sections, of means for supplying a heating medium thereto, means for varying the number of heater-sections supplied and for varying the amount of heat imparted by the heating medium according to the number of heater-sections supplied, substantially as described.

8. In an electric heater, the combination with heater-sections, of means for supplying electricity thereto, means for varying the number of heater-sections in circuit and for varying the strength of current supplied with the number of sections in circuit, substantially as described.

9. In an electric heater, the combination with heater-sections, of means for supplying electricity thereto, means for varying the number of heater-sections in circuit and for increasing the strength of current supplied as the number of sections in circuit is increased, substantially as described.

10. In an electric heater, the combination with heater-sections, of means for supplying electricity thereto, means for varying the number of heater-sections in circuit, means for passing the minimum current through the minimum number of heater-sections and for passing the maximum current through the maximum number of heater-sections, substantially as described.

In testimony whereof I have signed my name to this specification in the presence of two subscribing witnesses.

JAMES PHILIP ERIE.

Witnesses:
PAUL W. STEVENS,
J. J. McCARTHY.